United States Patent
Danghyan

(10) Patent No.: US 7,920,214 B2
(45) Date of Patent: Apr. 5, 2011

(54) METHOD FOR FORMATION OF A COLOR VIDEO IMAGE FOR PROJECTION SYSTEMS WITH ONE CATHODE RAY TUBE

(76) Inventor: Arayik Danghyan, Echmiadzin (AM)

( * ) Notice: Subject to any disclaimer, the term of this patent is extended or adjusted under 35 U.S.C. 154(b) by 1115 days.

(21) Appl. No.: 11/653,538

(22) Filed: Jan. 16, 2007

(65) Prior Publication Data
US 2007/0171314 A1    Jul. 26, 2007

Related U.S. Application Data

(60) Provisional application No. 60/761,785, filed on Jan. 25, 2006.

(51) Int. Cl.
*H04N 9/31* (2006.01)
(52) U.S. Cl. .......................................... 348/744; 348/805
(58) Field of Classification Search .................. 348/744, 348/750, 756–757, 759–760, 776, 805, 808–810, 348/816; 353/84, 30–31, 7–8, 94, 34, 37–38, 353/82; 359/634; *H04N 9/31*
See application file for complete search history.

(56) References Cited

U.S. PATENT DOCUMENTS

| | | | | |
|---|---|---|---|---|
| 6,309,072 B1 * | 10/2001 | Deter | ............................... | 353/31 |
| 7,014,318 B2 * | 3/2006 | Dho | ............................... | 353/31 |
| 7,417,799 B2 * | 8/2008 | Roth | ............................. | 359/634 |
| 7,794,092 B2 * | 9/2010 | Drazic et al. | .................... | 353/84 |

FOREIGN PATENT DOCUMENTS

| | | |
|---|---|---|
| JP | 2125590 | 5/1990 |
| JP | 4270375 | 9/1992 |
| RU | 94033858 | 7/1996 |
| RU | 2106070 | 2/1998 |
| RU | 2117413 | 8/1998 |
| RU | 2159013 | 11/2000 |
| RU | 2199144 | 2/2003 |
| WO | WO03061268 | 7/2003 |

* cited by examiner

*Primary Examiner* — Trang U Tran
(74) *Attorney, Agent, or Firm* — Aleksandr Smushkovich

(57) ABSTRACT

A method for formation of projection systems color video-images comprises: preliminary programmed processing of video-signals, dividing them into three primary colors components, and generating frame- and line-synchronizing pulses for CRT raster, provided by processing means; formation of three primary color images adjacently positioned on a screen of a single projection type one-beam CRT, the screen of which is divided into three rectangular areas for red, green and blue images wherein each area is coated by a red, green, or blue color phosphor layer respectively, and each image of a primary color is located on the corresponding phosphor layer of its color; superimposing the images to form a combined color image by optical means; displaying the combined color image on a common projection screen.

5 Claims, 3 Drawing Sheets

METHOD FOR FORMATION OF A COLOR VIDEO IMAGE FOR PROJECTION SYSTEMS WITH ONE CATHODE RAY TUBE

CROSS-REFERENCE TO RELATED APPLICATION

This application claims the benefit according to 35 U.S.C. 119(e) of a U.S. provisional patent application Ser. No. 60/761,785, filed on Jan. 25, 2006, the disclosure of which is incorporated herein in its entirety by reference.

FIELD OF THE INVENTION

The invention relates to methods for formation of video images for projection systems, providing projection for enlarged TV images or computer-assisted images on a large size reflective or transmissive screen, and can be used for designing of video projectors, video monitors, multimedia projectors, 3D projectors, projection TVs, HDTV devices, etc.

BACKGROUND OF THE INVENTION

Methods for formation of a video image with three monochrome cathode ray tubes (CRT) of primary colors red (R), green (G), and blue (B) are well-known, for example, a U.S. Patent Application No. 2005/0062896 filed on Mar. 24, 2005. In that method, images of primary colors (R, G, B), formed on separate CRTs, are projected on a common screen by means of projection objectives (lenses) and catadioptric optics, whereon superimposing the images occurs, and a color image is generated.

Another method, wherein images from three CRTs are preliminary combined by means of a cubic prism and dichroic (color-separating) mirrors and then projected on a common screen, is described in a Russian Federation patent No RU 2082206, as of Jun. 20, 1997. However, the following specific problems and drawbacks can be found in all known methods deploying three CRTs:

A) While projecting the three spatially separated images on the common screen, difficult-to-remove trapezoidal distortions arise.

B) Dissimilar changes of CRTs' characteristics in the course of time (due to dissimilar ageing, deterioration) result in image blur.

C) Devices that use three CRTs have large overall dimensions and mass, i.e. they are cumbersome.

D) The adjustment of the image congruence is carried out by mechanical means, which often lack precession.

The proposed invention is developed to solve the aforementioned problems, essentially differs from the currently used methods, and is aimed to significantly increase the quality of projected images.

BRIEF SUMMARY OF THE INVENTION

The invention provides a method for formation of a color video image for projection systems comprising the steps of: preliminary programmed processing of a video signal to divide it into three components of primary colors; generating frame- and line-synchronizing pulses for formation of a necessary raster further used for formation of images of three primary colors on a screen of a single projection type one-beam cathode ray tube, which screen is divided into three substantially equal adjacent rectangular areas for red, green and blue images, wherein each area is coated by a phosphor layer of the corresponding color, and each image of a primary color is located on the phosphor layer of its color; superimposing the images of primary colors to form a combined color image; displaying the combined color image.

According to the invention, the programmed processing of video images and the generating of the frame- and line-synchronizing pulses are substantially provided by a microprocessor means. The aforementioned single projection type one-beam cathode ray tube (CRT) and a CRT control unit (regulated by the frame- and line-synchronizing pulses) provide the formation of images of three primary colors on the corresponding areas of the screen of the CRT. The three images are further transmitted through an optical system, superimposed to obtain a combined color image, which combined image is further displayed on a common projection screen. The optical system includes dichroic mirrors (or prisms) for superimposing the three images, a conventional reflecting mirror, short-focus lenses, and a projection objective. A fine-tuning for obtaining the combined image is provided by a program adjustment control unit. The aforesaid means compose a video-projection device that carries out the above-described inventive method.

BRIEF DESCRIPTION OF THE DRAWINGS

The mentioned and/or other aspects and advantages of the present general inventive concept will become apparent and more readily appreciated from the following description of exemplary embodiments, taken in conjunction with the accompanying drawings of which.

A PREFERRED EMBODIMENT OF THE PRESENT INVENTION

Figure 1:
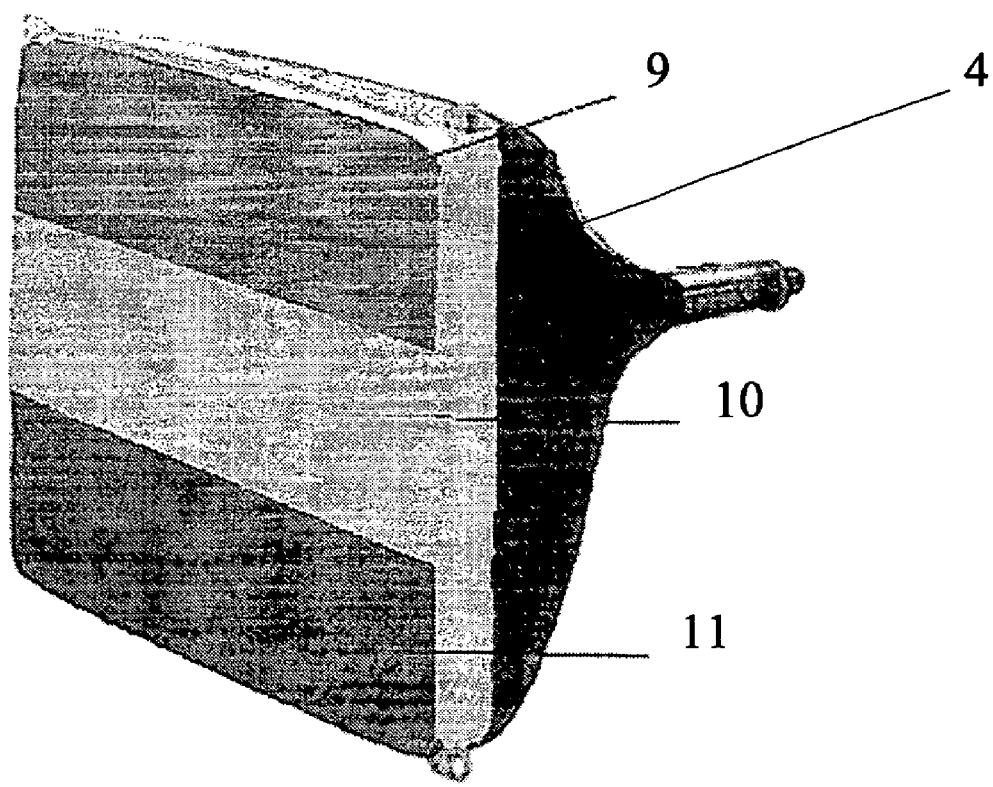
FIG. 1 is an overall perspective view of the cathode-ray tube.

While the invention may be susceptible to embodiment in different forms, there is shown in the drawings, and will be described in detail herein, specific embodiments of the present invention, with the understanding that the present disclosure is to be considered an exemplification of the principles of the invention, and is not intended to limit the invention to that as illustrated and described herein.

The further explanation of the invention will be given by an example of a preferred embodiment of a video-projection device illustrated on FIG. 2. The video-projection device for implementation of the proposed method comprises: a microprocessor unit (1) for processing of video signal; a CRT control unit (2); a deflection yoke (3); a single one-beam cathode ray tube—CRT (4) of projection type, which has usually a high brightness; a dichroic mirror (or prismatic) system (5) (or simply a mirror system) for superimposing images, including a conventional reflecting mirror (r), dichroic mirrors (g) and (b); short-focus lenses (L1), (L2), (L3); a projection objective (lens) (6); a common projection screen (7); and a program adjustment control unit (8).

The images of three primary colors (R), (G), (B) are disposed side-by-side on the screen of CRT (4) of a special construction (as shown on FIG. 1). The screen of the CRT (4) is divided into three adjacent substantially equal rectangular areas (9), (10) and (11) for red (R), green (G) and blue (B) images respectively, each said area has a predetermined width and length, and each said area is coated by a phosphor layer (or simply phosphor) of the corresponding color. The size ratio of the width and length of aforesaid areas are chosen depending on the necessary ratio of image frame sizes, e.g. 5:3, 16:9, etc.

Figure 3:
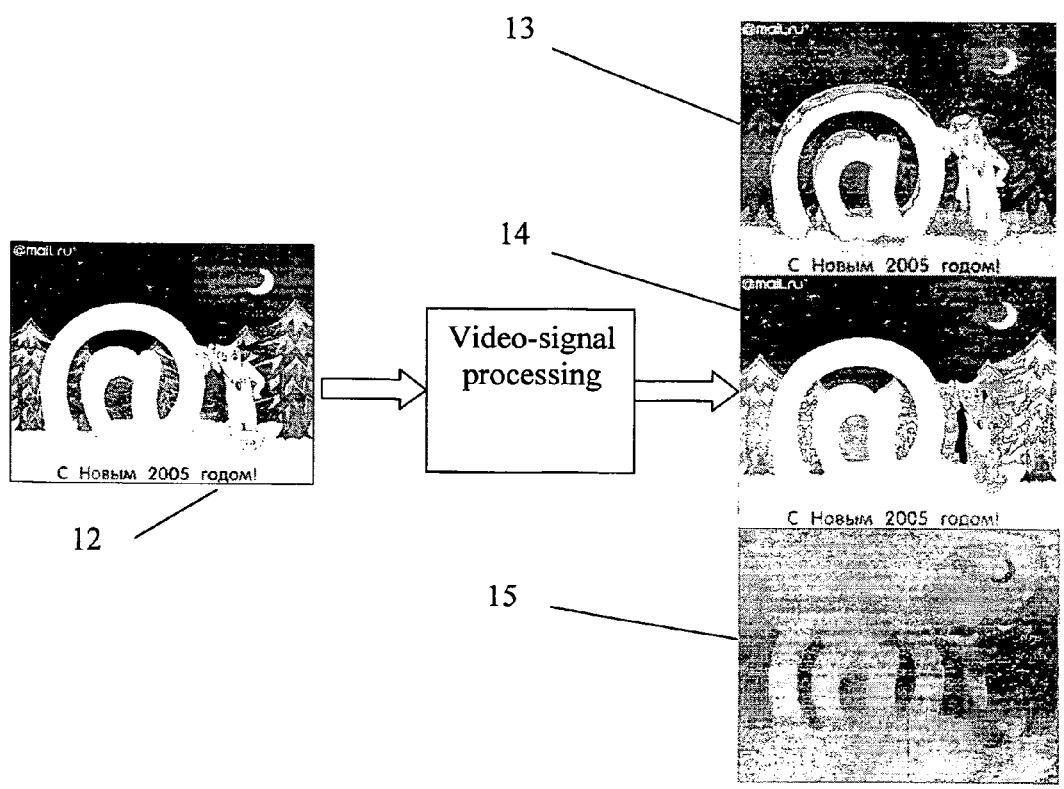
FIG. 3 is a pictorial representation of the inventive concept of video-signal processing by an example of a single frame of image.

The concept of the video-signal processing is shown on FIG. 3, wherein a received analog video signal of an exemplary color image (12) is divided (separated) into three primary color (R, G, B) signals of respective images (13), (14), and (15). Other embodiments may be implemented for digital received video signals that they do not substantially alter the concept of the inventive method and device, since in such an embodiment the microprocessor unit (1) would simply not convert the digital signals into the digital form.

Figure 2:
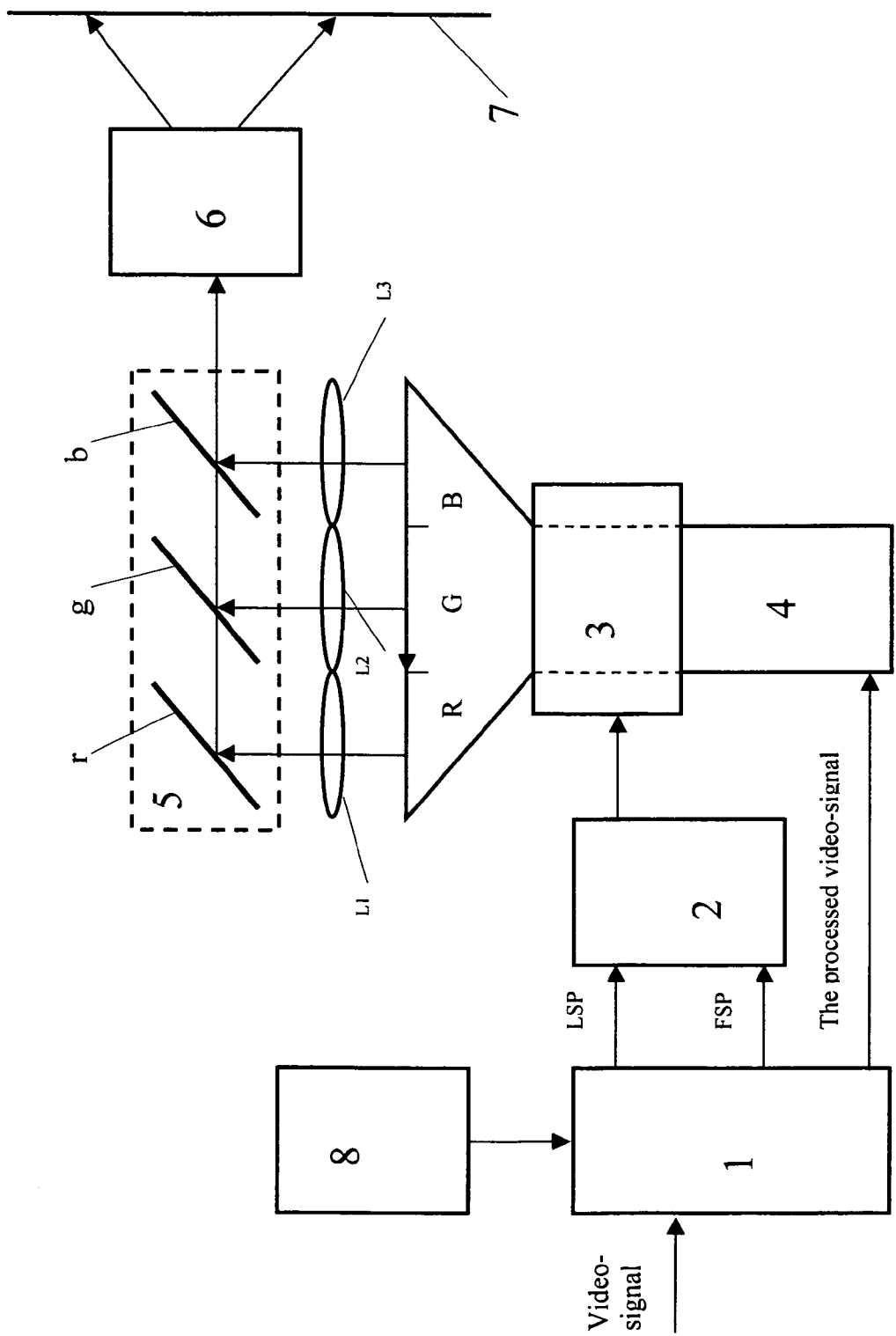
FIG. 2 is a flowchart of the video-projection device.

As illustrated on FIG. 2, opposite the screen of CRT (4), three short-focal-length rectangular (according to the sizes of R, G, B images) lenses (L1), (L2), (L3) are disposed. The lenses are positioned parallel to the surface of the screen of CRT (4), in a predetermined distance from the screen of CRT (4), so that the images of the primary colors (R, G, B) are situated substantially on the focal plane of the lenses (L1, L2, L3). The lenses are intended for focusing the images of primary colors in infinity, that provides further generation of the color image in one plane.

The dichroic mirror (or prismatic) system (5) for superimposing the images is disposed in a predetermined distance from the lenses as shown on FIG. 2. The system (5) comprises three mirrors: a reflecting mirror (r) and two dichroic mirrors (g) and (b). The mirrors are inclined towards the surface of the screen of CRT (4) at a 45 degrees angle, so that they are positioned parallel to each other and have a common optic axis. The mirror (r) reflects the red frame, the mirror (g) transmits the red frame and reflects the green frame, and the mirror (b) transmits the red and green frames and reflects the blue frame. Thereafter, color rays, carrying information of the three color frames, are superimposed while being output from the system (5) to form one combined color image.

The projection objective (lens) (6), shown on FIG. 2, has an optic axis substantially coinciding with the aforesaid common optic axis of the mirrors, to further provide an enlargement of the combined color image, which then can be transmitted and displayed on the common projection screen (7).

The program adjustment control unit (8), depicted on FIG. 2, is intended for shifting the separate primary color images within a predetermined (typically a sufficiently small) range with the purpose of their substantially precise superimposing, and final adjustment. It also serves for program control of other characteristics of the video signal (brightness, contrast, a saturation, etc.).

In a preferred embodiment, depicted on FIG. 2, the video-projection device operates as follows: an analog video signal enters the microprocessor unit (1) for processing the video signal, in which unit (1) the signal is digitized (converted into the digital form) and subjected to a program processing with the purpose of division of an image, corresponding to the video signal, into three components (frames) of primary colors (R, G, B), as denoted above. The microprocessor unit (1) also substantially provides the generating of corresponding frame- (FSP) and line-synchronizing (LSP) pulses.

The FSP and LSP enter the CRT control unit (2) and therefrom are further input via the yoke (3) into the CRT (4). Therefore, the processed video-signal enters the CRT (4), wherein a corresponding raster is formed on the screen of CRT (4), that is the information of the red (13) frame (as exemplified on FIG. 3) exposes the red phosphor (9) (as indicated on FIG. 1), the information of the green (14) frame exposes the green phosphor (10), and the information of the blue (15) frame exposes the blue phosphor (11) of the CRT (4). As a result of the CRT operating, three monochrome images of primary colors (13, 14, 15) are formed on the screen of CRT (4) in the phosphor areas of corresponding colors (9, 10, 11).

The three images of primary colors (for example, (13), (14), (15) (as illustrated on FIG. 3) are further transmitted through the lenses (L1, L2, L3), mirror system (5), wherein the images of primary colors are optically superimposed to obtain one combined color image, which is then enlarged by the projection objective (lens) (6), and thereafter transmitted and displayed on the common projection screen (7). It should be noted that the sequence of the primary colors (R, G, B) on the CRT screen is conditional and any other sequence (B,R,G; G,R,B; etc.) is also possible.

Thusly, the proposed invention essentially solves the above mentioned problems of known prior art methods and devices, and consequently increases the quality of projected image. It results in the following advantages:

a) Three images of primary colors are easily combined, and their final superimposing is controlled not by a mechanical regulation, but by means of program adjustment control, which substantially enhances the precision of the device.

b) Changes of CRT characteristics in the course of time (e.g., due to dissimilar ageing, deterioration) occur identically to all the three color areas, as only one CRT is used, and the once adjusted system doesn't substantially deviate from its balanced state.

c) The proposed method is carried out by a compact projection device with small overall dimensions and weight, since only one CRT is used therein.

d) The proposed method can be advantageous for the realization of high definition TV (HDTV) projection, because it ensures a substantially precise and stable superimposing of three primary colors images.

e) The invention can be easily implemented at a present state of the art, because conventionally employed components are used for its construction, namely: the one-beam cathode ray tube of the proposed design, which may be produced by the well known technology of monochromic projection type tubes; dichroic mirrors and prisms; projection objective (lens), etc. The real time program processing of the video-signal with triple speed can be performed based on suitable conventional microprocessors.

While a preferred embodiment of this invention has been illustrated and described, variations and modifications may be apparent to those skilled in the art. Therefore, the present invention is not limited thereto and its scope and breadth should be determined from the appended claims, rather than from the above description.

I claim:

1. A method for formation of a color video image for projection systems comprising the steps of
   (a) providing a processing means for receiving a video signal, processing the video signal to divide it into three components of primary colors, corresponding to three primary color images, for red, green, and blue images, and generating frame- and line-synchronizing pulses;
   (b) providing a single projection type one-beam cathode ray tube; said cathode ray tube having a screen divided into three adjacent substantially rectangular equal areas for red, green and blue images, wherein each area is coated by a phosphor layer of the corresponding color; said cathode ray tube capable to produce each said primary color image in the screen area having the phosphor layer corresponding to the color of said image;
   (c) providing a CRT control means for control of the cathode ray tube;

(d) providing optical means for receiving and superimposing the color images produced by the cathode ray tube, and obtaining a combined color image;

(e) providing a program adjustment control means for fine-tuning at least the combined color image;

(f) providing a common projection screen capable to receive and display the combined color image;

(g) processing the video signal to divide it into three components of primary colors, corresponding to three primary color images, by said processing means;

(h) generating frame- and line-synchronizing pulses for formation of a necessary raster for projection of the primary color images by said processing means;

(i) formation of images of three primary colors based on the processed video signal and the formed raster, substantially by said CRT control means and said cathode ray tube; the images produced in the corresponding areas of the screen of said cathode ray tube;

(j) optically superimposing the primary color images to form a combined color image by said optical means;

(k) transmitting the combined color image from said optical means to said common projection screen;

(l) displaying the combined color image on the common projection screen; and (m) fine-tuning the combined image by said program adjustment control means.

2. The method according to claim 1, wherein said video signal provided in an analog form.

3. The method according to claim 1, wherein said video signal provided in a digital form.

4. The method according to claim 1, wherein said optical means including three short-focal-length rectangular lenses disposed in a predetermined distance from the cathode ray tube, according to the sizes of the primary color images and substantially parallel to the screen of said cathode ray tube;

a mirror system disposed in a predetermined distance from said lenses; the mirror system including a reflecting mirror, reflecting red images; a first dichroic mirror, transmitting red images and reflecting green images; and a second dichroic mirror, transmitting red and green images and reflecting blue images; which mirrors all inclined towards the surface of the screen of the cathode ray tube at a 45 degrees angle, so that they positioned parallel to each other and having a common optic axis; and a projection objective (lens), having an optic axis substantially coinciding with said common optic axis of the mirrors.

5. A method for formation of a color video image for projection systems comprising the steps of providing a processing means for receiving and processing a video signal to divide it into three components of primary colors, corresponding to three primary color images for red, green, and blue images;

providing a single projection type one-beam cathode ray tube; said cathode ray tube having a screen divided into three adjacent substantially rectangular equal areas for red, green and blue images, wherein each area coated by a phosphor layer of the corresponding color; said cathode ray tube capable to produce each said primary color image in the screen area having the phosphor layer corresponding to the color of said image;

providing optical means for receiving and superimposing the color images, produced by the cathode ray tube, and obtaining a combined color image;

providing a common projection screen capable to receive and display the combined color image;

processing the video signal to divide it into three components of primary colors, corresponding to three primary color images, by said processing means;

producing the images of three primary colors, based on the processed video signal, in the corresponding areas of the screen of said cathode ray tube;

optically superimposing the primary color images to form a combined color image by said optical means;

transmitting the combined color image from said optical means to said common projection screen; and displaying the combined color image on the common projection screen.

* * * * *